United States Patent [19]

Kodaira et al.

[11] Patent Number: 4,684,233

[45] Date of Patent: Aug. 4, 1987

[54] PHOTOGRAPHIC OPTICAL SYSTEM DRIVE DEVICE FOR CAMERA

[75] Inventors: Takanori Kodaira, Tokyo; Akihiro Namai, Kanagawa; Akira Egawa, Tokyo, all of Japan

[73] Assignee: Canon Kabushiki Kaisha, Tokyo, Japan

[21] Appl. No.: 835,966

[22] Filed: Mar. 4, 1986

[30] Foreign Application Priority Data

Mar. 14, 1985 [JP] Japan .......................... 60-036900[U]
Mar. 14, 1985 [JP] Japan .......................... 60-036901[U]

[51] Int. Cl.⁴ .............................................. G03B 3/10
[52] U.S. Cl. .................................................. 354/400
[58] Field of Search ..................... 354/195.1, 400, 402, 354/403, 409

[56] References Cited

U.S. PATENT DOCUMENTS

| 4,146,316 | 3/1979 | Osawa | 354/409 X |
| 4,294,526 | 10/1981 | Nakagawa | 354/402 |
| 4,314,748 | 2/1982 | Kawabata et al. | 354/195.1 X |
| 4,560,266 | 12/1985 | Namai et al. | 354/400 |

*Primary Examiner*—Donald A. Griffin
*Attorney, Agent, or Firm*—Toren, McGeady & Associates

[57] ABSTRACT

This patent application discloses a device for driving the photographic optical system of the camera in which a switch for detecting when the photographic optical system reaches an initial position is made responsive to the moved position of cam means that controls the axial position of the optical system, and the phase of the optical system with the switch is made delayed in relation to the phase of the optical system with the cam means, thereby an improvement of accuracy is achieved.

19 Claims, 6 Drawing Figures

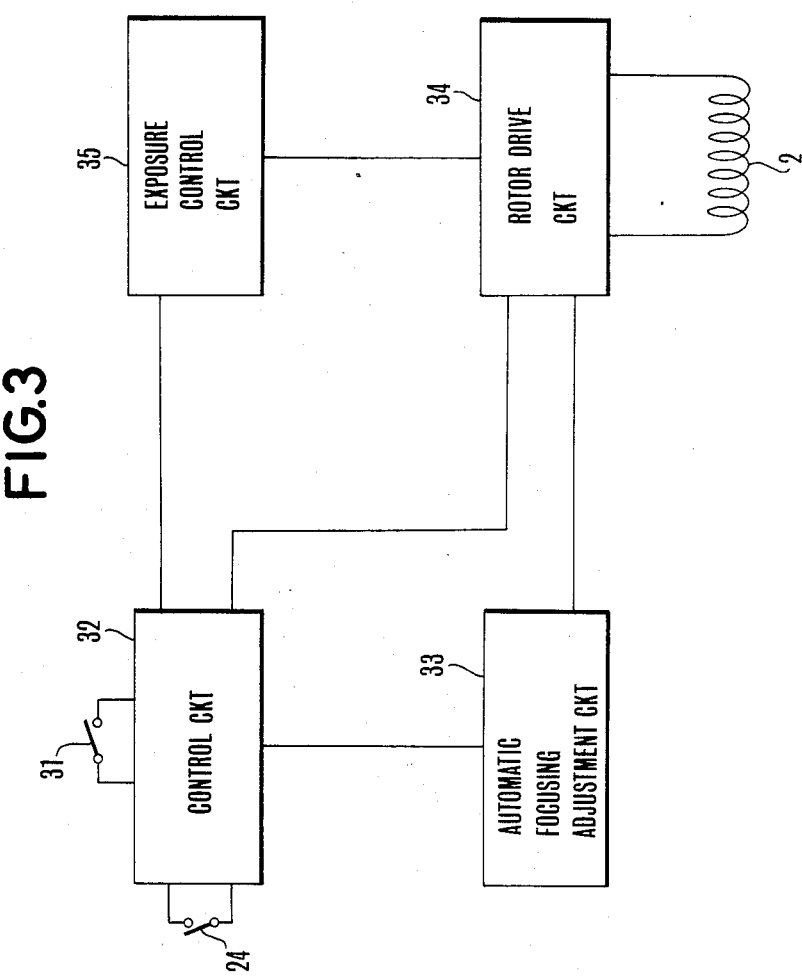

PHOTOGRAPHIC OPTICAL SYSTEM DRIVE DEVICE FOR CAMERA

BACKGROUND OF THE INVENTION

1. Field of the Invention

This invention relates to devices for driving a photographic optical system of the camera to move stepwise by utilizing the torque obtained with an energized coil in a magnetic field so as to effect focusing (hereinafter called "electromagnetically driven lens barrel"), and more particularly, to an arrangement of a switch for setting an initial position in that kind of lens barrels.

2. Description of the Prior Art

It is known, in U.S. Pat. No. 4,560,266 issued on Dec. 24, 1985 and assigned to the assignee of the present invention, to provide this kind of electromagnetically driven lens barrel in which the barrel is first moved forward stepwise to an in-focus position, and after an exposure has been made, it is then reset in an initial position, thus being readied for the next shot. To detect when the resetting of the barrel has been completed, it has been customary to arrange an actuator for a switch on the barrel at a radial side thereof so that the movable contact of the switch is depressed by the actuator when the barrel reaches the initial position.

In the conventional electromagnetically driven lens barrel, as shown in FIG. 4A, the barrel 102 containing the lens 101 has a cam follower pin 102a pressed against the camming surface 103a of the cam ring 103 by a return spring (not shown). By turning the cam ring 103 in a direction indicated by arrow "i", the barrel 102 is axially moved forward to effect focusing. After an exposure with the lens 101 in focus, has been completed, the cam ring 103 is turned again in the same direction of arrow "i", until the camming surface 103a moves away from the pin 102a. Thus, as the pin 102a drops from the crest 103b to the valley 103c, the barrel 102 is reset in the initial position. By the way, for the purposes of minimizing the frictional force of the pin 102a and of enabling the height of the pin 102a to be adjusted by turning it about its own axis, the end of the pin 102a is formed to a semi-spheric shape. From this reason, it results that during the resetting operation, soon after the vertex of the lobe 102a overruns the terminal edge 103b of the camming surface 103a, an impulse of force F2 perpendicular to the force F1 of pressing the barrel 102 against the cam ring 103 is given to the cam ring 103 as shown in FIG. 4B, causing the latter to go beyond the initial position despite no electromagnetic force being applied thereto. It has, therefore, been impossible to insure that the barrel 102 is reset in the initial position with high accuracy and reliability.

SUMMARY OF THE INVENTION

With the foregoing in mind, the present invention has been made. An object of the present invention is to define an initial position of a lens barrel by delaying the timing of actuation of an initial position detecting switch for detecting that the lens barrel has reached the initial position, at least one step from the timing when a cam follower pin of the lens barrel falls to the valley of cam means for stepwise moving the lens barrel. So, the resetting of the lens barrel is established after the above-identified cam means has moved one gear tooth (or more) from the position at which the cam follower pin falls to the valley of the camming means. Thus, it is made possible to insure that, regardless of whether or not the impulse exerted from the fall of the cam follower pin to the valley of the camming surface moves the cam means, the lens barrel when set always takes the initial position with a high degree of accuracy.

These and and other objects of the present invention will become apparent from the following description of an embodiment thereof.

BRIEF DESCRIPTION OF THE DRAWINGS

FIG. 3 is a block diagram of the circuitry of the camera employing the lens barrel of FIG. 1.

DETAILED DESCRIPTION OF THE PREFERRED EMBODIMENT

Figure 1:
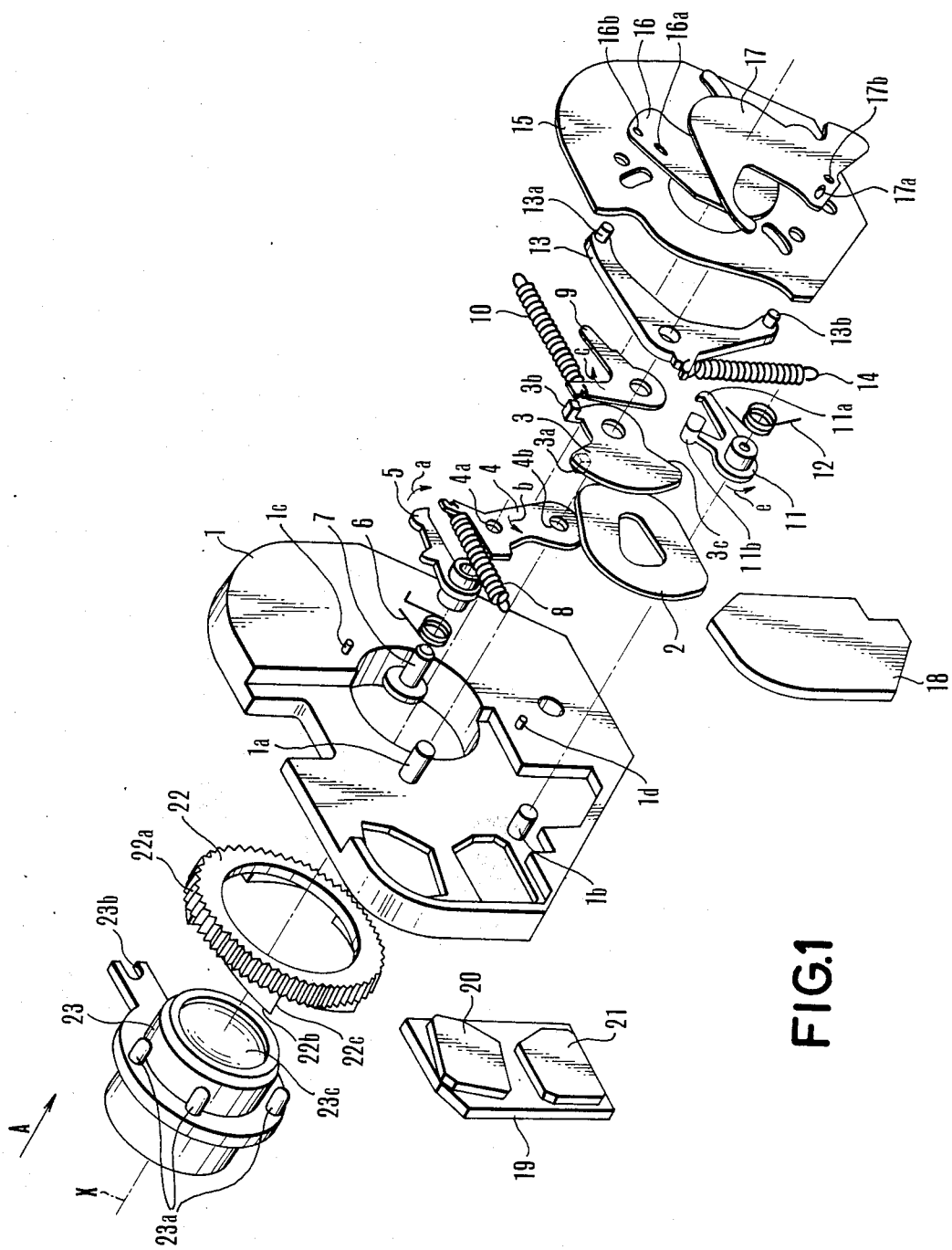
FIG. 1 is an exploded perspective view of an embodiment of an electromagnetically driven lens barrel according to the present invention.

The present invention is next described in connection with an embodiment thereof by reference to the drawings. Referring to FIG. 1, the electromagnetically driven lens barrel of the invention comprises a base plate 1 having stub shafts 1a, 1b, 1c and 1d formed in unison therewith, a coil 2 fixedly mounted to a holder 3 which is pivotally mounted on the shaft 1a, and a reciprocating lever 4 having two holes 4a and 4b of which the first 4a fixedly carries a pivot pin 7 for a ratchet 5 by caulking means and the second 4b is rotatably fitted on the shaft 1a. A spring 6 urges the ratchet 5 in a clockwise direction of arrow "a". Another spring 8 urges the reciprocating lever 4, in a counterclockwise direction of arrow "b", to abut on a stopper (not shown) on the base plate 1. The holder 3 has extensions 3a and 3b and a camming surface 3c. The reciprocating lever 4 normally abuts on the extension 3a. A closing lever 9 is pivotally mounted on the shaft 1a, and is urged by a spring 10 to turn in a clockwise direction of arrow "c" until it abuts on a stopper (not shown) on the base plate 1. The second extension 3b of the holder 3 abuts on one arm of the closing lever 9. For this reason, the holder 3 is positioned between the reciprocating lever 4 and the closing lever 9. A latch lever 11 is rotatably fitted on the shaft 1b, and is urged by a spring 12 to turn in a counterclockwise direction of arrow "e", until it abuts on a stopper (not shown) on the base plate 1. The latch lever 11 and has a pawl 11a, arranged to engage an extension (not shown) on an opening lever 13, and a protuberance 11b arranged to be engageable on the camming surface 3c of the holder 3. The opening lever 13 is pivotally mounted on the shaft 1a and has another extension (not shown) abutting the closing lever 9. A spring 14, which is weaker than the spring 10, urges the opening lever 13 to open shutter blades 16 and 17 because drive connection pins 13a and 13b on respective arm ends of the lever 13 extend into elongated slots 16a and 17a of the shutter blades 16 and 17, respectively. Holes 16b and 17b of these shutter blades 16 and 17 are rotatably fitted on the shaft 1c and 1d. Therefore, when the opening lever 13 turns in a counterclockwise direction, the shutter opens.

An apertured plate 15 supports the shutter blades 16 and 17 in contact therewith. Two magnet pieces 20 and 21 of opposed polarity in the direction of thickness are fixedly mounted on a front yoke 19. The coil 2 is arranged between the front yoke 19 and a rear yoke 18, and, upon energization, turns about the shaft 1a.

Figure 2A:
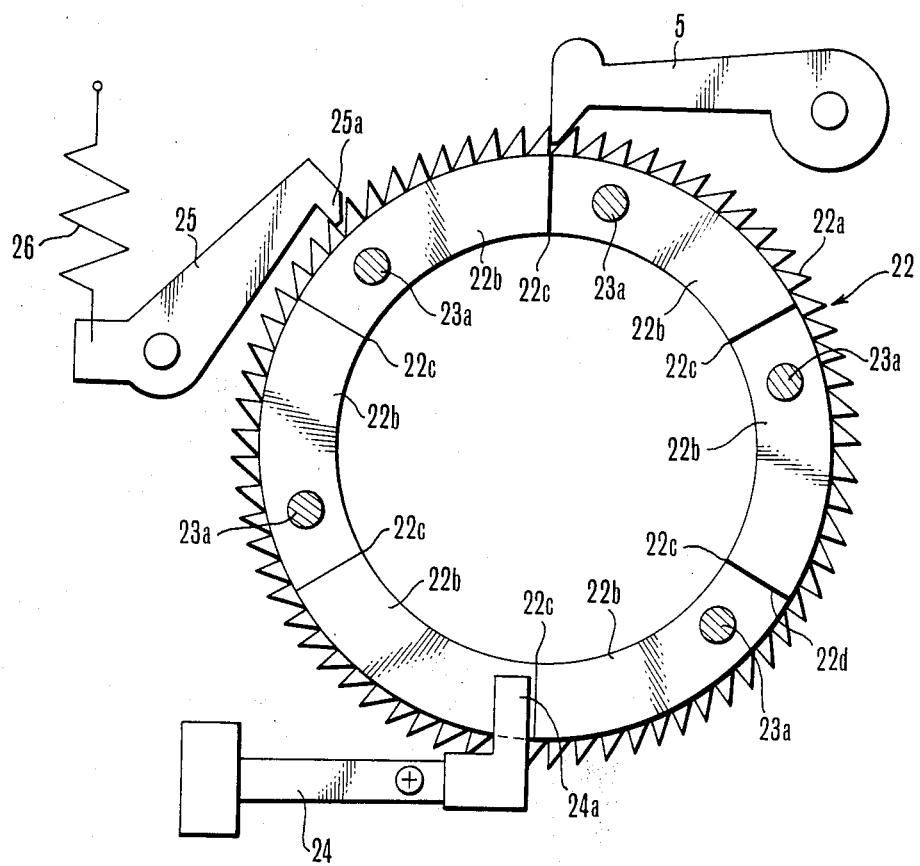
FIG. 2A is a front elevational view looked from a direction of arrow A of the cam ring of FIG. 1, and members associated therewith.
Figure 2B:
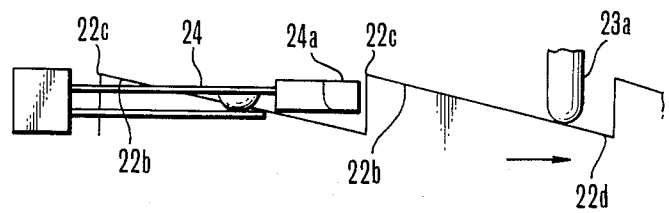
FIG. 2B is a plan view of the cam ring and the detector switch of FIG. 1.
Figure 4A:
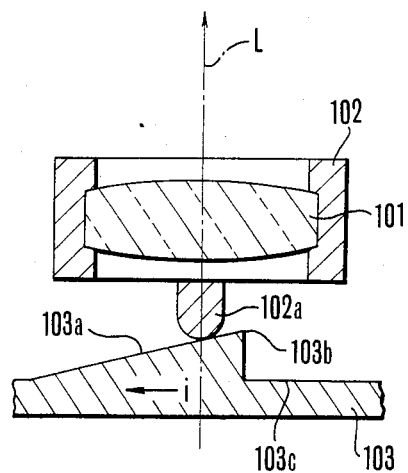
FIGS. 4A and 4B are sectional views illustrating an example of a conventional electromagnetically driven lens barrel and how the cam follower pin affects the cam ring, respectively.
Figure 4B:
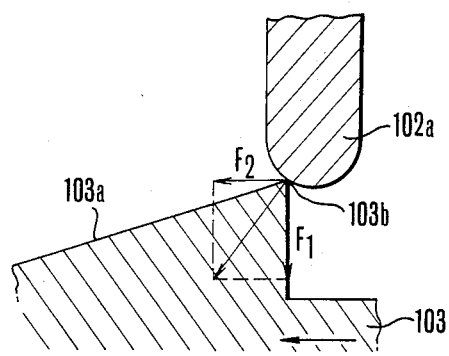

A cam ring 22, serving as the cam member, is supported on the base plate 1 to rotate about an optical axis X. The construction and arrangement of this cam ring 22 and its associated members are illustrated in FIGS. 2A and 2B as viewed from the direction of arrow A of FIG. 1. Formed in the outer periphery of the cam ring 22 are ratchet teeth 22a cooperating with the ratchet 5. Six cams 22b of similar shape are formed in unison with the cam ring 22 at the front end wall thereof in equally spaced relation. A lens barrel 23 containing an optical system 23c has a flange on which are fixedly mounted five lobes 23a in equally spaced relation. The lobes 23a abut on respective individual ones of the cam elements 22b, each of which has a crest 22c and a valley 22d. A radial extension of the flange has a "U"-shaped recess 23b slidably fitted on a guide rail (not shown) on the base plate 1 so that the barrel 23 is restrained from rotation about the optical axis X. Therefore, clockwise movement of the cam ring 22 is transmitted to forward axial movement of the lens barrel 23. In FIG. 2A, a pawl lever 25 is pivotally mounted on a pin fixedly mounted to the base plate 1, and is urged by a spring 26 in a clockwise direction so that a nose 25a engages one of the ratchet teeth 22a to prevent the cam ring 22 from rotating in the clockwise direction, although counterclockwise rotation is allowed. A switch 24 has a movable contact on which is carried an actuator 24a extending into the path of the camming surfaces 22b. When the cam ring 22 is its initial position shown in FIGS. 2A and 2B, as is before a release button of the camera is pushed down, the actuator 24a is not in contact with the camming surface 22b, closing the switch 24.

The operation is next described by reference to an electrical circuit block diagram of FIG. 3. When a release switch 31 in the camera is closed, a control circuit 32 produces a start signal for a range finding operation of an automatic focusing adjustment circuit 33 and, after a while, an actuating signal for a rotor drive circuit 34. As the coil 2 is supplied with current, it turns along with the holder 3 in the clockwise direction (FIG. 1). Such movement of the holder 3 causes the reciprocating lever 4 to turn in the clockwise direction against the spring 8 in engagement with the extension 3a, while rotating the cam ring 22 as the ratchet 5, in engagement with one of the teeth 22a, moves to the left as viewed in FIG. 2A. When the cam ring 22 has rotated a prescribed angle, the ratchet pawl 25 engages the next tooth. During this time, the lens barrel 23 is driven to axially move one step forward. Just after that, the supply of current to the coil 2 is cut off, permitting the coil 2 to return to its initial position under the action of the spring 8, leaving the cam ring 22 in the advanced position. Then the ratchet 5 comes to engage an adjacent tooth (the tooth backward one tooth from the preceding). Such procedure repeats itself until the lens 23c is focused to the object distance measured by the range finder. When such a focusing adjustment has been completed, the control circuit 32 produces a second actuating signal for an exposure control circuit 35. The coil 2 is then supplied with current flowing from the rotor drive circuit 34 in an opposite direction to that when the lens was focused, turning in the counterclockwise direction along with the holder 3 (FIG. 1). Because the second extension 3b engages the closing lever 9, the holder 3 drives the closing lever 9 to turn in the counterclockwise direction against the spring 10, leaving the opening lever 13 behind as it is locked by the latch lever 11. Thus, the path of movement of the opening lever 13 is cleared of the closing lever 9. When the coil 2 has rotated to a certain position, the camming surface 3c of the holder 3 comes to strike the protuberance 11b of the latch lever 11, thereby the latch lever 11 is turned in the clockwise direction against the spring 12. Thus, the opening lever 13 is released from the locked connection. The opening lever 13 then turns in the counterclockwise direction under the action of the spring 14 to open the shutter blades 16 and 17, initiating an exposure. In an exposure time, the exposure control circuit 35 produces a signal for cutting off the supply of current to the coil 2. The return spring 10 then moves the closing lever 9, holder 3 and coil 2 as a unit in the clockwise direction to their initial positions. During this time, the closing lever 9 brings the opening lever 13 also to its initial position where the shutter is closed.

After that, the control circuit 32 produces another actuating signal for the rotor drive circuit 34. So a further forward axial movement of the lens barrel 23 proceeds. It is to be noted here that the actuator 24a opens the switch 24 when it is lifted by the camming surface 22b as the cam ring 22 rotates, at an intermediate point in the total axial movement of the lens barrel 23. (This point may occur either before or after the exposure.) The later forward axial movement of the lens barrel 23 continues until the crests 22c of the camming surfaces 22b move away from the respective lobes 23a. As the lobes 23a fall to the valleys 22d, the lens barrel 23 then returns to the opposite terminal end. After that, the cam ring 22 further rotates a number of ratchet teeth, permitting the lens barrel 23 to start again axially moving the equal number of steps forward before the crest 22c moves away from the actuator 24a. Therefore, the switch 24 is turned to ON state. Responsive to the output of the closed switch 24, the control circuit 32 cuts off the supply of current to the coil 2. Thus, the resetting operation terminates in the initial position of FIG. 2A. In such a manner, the timing of fall of the actuator 24a for the switch 24 is delayed by at least one tooth from the timing of fall of the lobes 23a. Hence, even if the fall of the lobes 23a from the crests 22c to the valleys 22d gives off an impulse to the cam ring 22 and so causes further rotation of it, for, as at this time the switch 24 is not closed yet, the cam ring 22 continues rotating until the actuator 24a falls, the phase of the lobes 23a to the camming surfaces 22b can be always made constant when the rotation of the cam ring 22 stops as the initial position is reached. This makes it possible to insure that the lens barrel 23 is set in the initial position with high accuracy. The initial position itself can be changed by moving the guide rail for the U recess 23b in a circle with its center at the optical axis. With this, the initial position is assigned to a particular object distance, for example, infinity.

As has been described above, according to the present invention, the timing when an initial position detecting switch, for detecting an initial position of a photographic optical system, detects the initial position of the photographic optical system, is delayed from the timing when the photographic optical system reaches the initial position relative to cam means for moving the photographic optical system. This produces an advantage that, even if the photographic optical system is shifted a relative to the position of the cam means when returning to the initial position, the setting to the initial position can always be performed with a high degree of accuracy.

What is claimed is:

1. A photographic optical system drive device for a camera comprising:
   (a) a photographic optical system;
   (b) cam means for moving said photographic optical system back and forth between a first position and a second position, said photographic optical system moving again to the first position after movement from said first position to said second position in response to movement of said cam means in a predetermined direction;
   (c) drive means for moving said cam means in the predetermined direction; and
   (d) detecting means for detecting an initial position of said photographic optical system when said photographic optical system has moved a prescribed distance from said first position toward said second position.

2. A device according to claim 1, wherein said drive means is arranged to stop operation in response to detection of the initial position of said photographic optical system by said detecting means.

3. A device according to claim 1, further comprising control means for controlling said drive means, said control means adjusting focusing of said photographic optical system by said drive means.

4. A device according to claim 1, wherein said drive means includes ratchet means for moving said cam means in said predetermined direction.

5. A device according to claim 4, wherein said ratchet means includes:
   (a) ratchet teeth provided in unison with said cam means;
   (b) a drive pawl arranged to engage one of said ratchet teeth, said drive pawl moving said ratchet teeth in said predetermined direction; and
   (c) electromagnetic drive means for driving said drive pawl.

6. A device according to claim 4, wherein said cam means are arranged to rotate about an optical axis of said photographic optical system.

7. A device according to claim 6, further comprising:
   a barrel holding said photographic optical system, said barrel being provided in unison with a plurality of cam followers for engagement with said cam means.

8. A device according to claim 4, wherein said cam means includes return portions for returning said photographic optical system from said second position to said first position by further moving said photographic optical system by said ratchet means after said photographic optical system has been put in said second position.

9. A device according to claim 1, wherein said detecting means includes a switch arranged to be opened and closed by said cam means.

10. A photographic optical system drive device for a camera comprising;
    (a) a photographic optical system;
    (b) drive means for driving said photographic optical system, said drive means including cam portions capable, upon movement in a constant direction, of displacing said photographic optical system between first and second positions, and ratchet means for moving said cam portions in a constant direction, wherein said cam portions are arranged to rotate about an optical axis of said photographic optical system;
    (c) detecting means for detecting an initial position of said photographic optical system when said photographic optical system has moved a prescribed distance from said first position toward said second position; and
    (d) a barrel holding said photographic optical system, said barrel being provided in unison with a plurality of cam followers for engagement with said cam portions.

11. A device according to claim 10, wherein said cam portions are provided plural in number.

12. A device according to claim 10, wherein said cam means are provided plural in number.

13. A photographic optical system drive device for a camera comprising:
    (a) a photographic optical system;
    (b) drive means for driving said photographic optical system, said drive means including cam portions capable, upon movement in a constant direction, of displacing said photographic optical system between first and second positions, and ratchet means for moving said cam portions in a constant direction; and
    (c) detecting means for detecting an initial position of said photographic optical system when said photographic optical system has moved a prescribed distance from said first position toward said second position, wherein said cam portions include return portions for returning said photographic optical system from said second position to said first position by further moving said photographic optical system by said ratchet means after said photographic optical system has been put in said second position.

14. A photographic optical system drive device for a camera comprising:
    (a) a photographic optical system;
    (b) drive means for driving said photographic optical system, said drive means including cam portions capable, upon movement in a constant direction, of displacing said photographic optical system between first and second positions; and
    (c) detecting means for detecting an initial position of said photographic optical system when said photographic optical system has moved a prescribed distance from said first position toward said second position, wherein said detecting means includes a switch arranged to be opened and closed by said cam portions.

15. An optical drive device, comprising:
    (a) an optical system shiftable from a first portion toward a second position, said optical system having a possibility of returning to a position different from said first position instead of returning to said first position;
    (b) drive means for driving said optical system from said first position toward said second position;
    (c) detection means for detecting an initial position of said optical system when said optical system shifts a predetermined amount from said first position toward said second position; and
    (d) control means for controlling the drive of said optical system by said drive means, wherein said control means starts counting the drive amount of said optical system from when said detection means detects the initial position.

16. A device according to claim 15, wherein said drive means stops the drive of said optical system in response to the detection of the initial position by said detection means.

17. A device according to claim 15, wherein said control means includes counter means for counting the drive amount in accordance with an adjustment amount of focusing of said optical system.

18. A device according to claim 15, wherein said drive means includes a step-wise drive means for step-wisely driving said optical system.

19. A device according to claim 18, wherein said step-wise drive means includes ratchet means.

* * * * *